March 3, 1970   J. H. LUMN   3,498,572
LIGHTNING PROTECTION FOR AIRCRAFT COMPONENTS
Filed Aug. 31, 1967
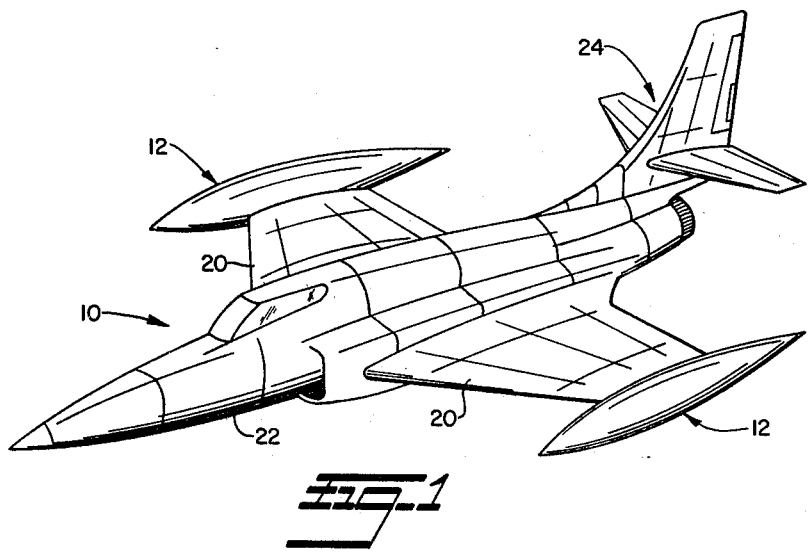
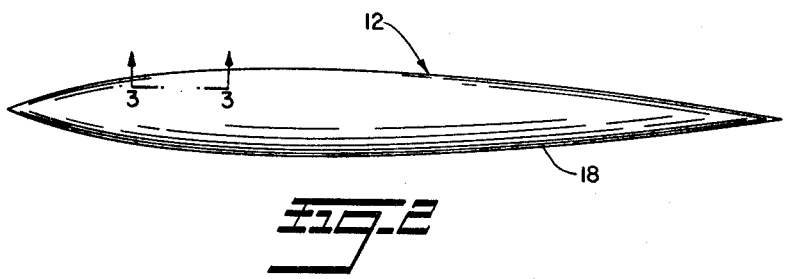
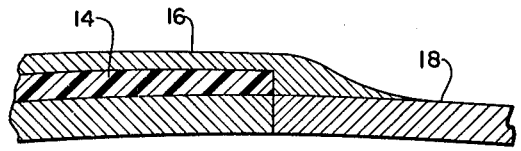
INVENTOR
John H. Lumn
BY *Strauch, Nolan, Neale, Nies & Kurz*
ATTORNEYS

United States Patent Office 3,498,572
Patented Mar. 3, 1970

3,498,572
LIGHTNING PROTECTION FOR AIRCRAFT
COMPONENTS
John H. Lunn, El Cajon, Calif., assignor, by mesne assignments, to Ametek, Inc., New York, N.Y., a corporation of Delaware
Continuation-in-part of application Ser. No. 652,276, July 10, 1967, which is a continuation-in-part of application Ser. No. 642,492, May 31, 1967. This application Aug. 31, 1967, Ser. No. 664,709
Int. Cl. B64d 45/00
U.S. Cl. 244—1                                       7 Claims

ABSTRACT OF THE DISCLOSURE

A lightning protection system for aircraft components apt to be struck by lightning such as wings, external fuel tanks, etc. including a thin, heat resistant, insulating reinforced plastic covering the leading portion of the component to be protected and a conductive coating superimposed on the insulating material and electrically connected to a ground or dispersal area together with an improved method for applying the coatings in which a part of the conductive material is applied before the reinforced plastic layer is cured.

RELATION TO OTHER APPLICATIONS

This application is a continuation-in-part of application No. 652,276 filed July 10, 1967, which is a continuation-in-part of application No. 642,492 filed May 31, 1967.

BACKGROUND, SUMMARY AND OBJECTS OF THE INVENTION

The present invention relates to lightning protection systems and, more specifically, to systems for and methods of protecting aircraft and other aeronautical vehicles against damage from lightning strikes.

Modern aircraft have a number of components which are apt to be struck by lightning such as the fuselage, wings, tail assembly, and external fuel tanks. For the most part the lightning strikes are received on the forward or leading edges of these components.

Lightning strikes are capable of producing such intense concentrations of electrical energy as to physically damage the aircraft component they strike by puncturing and/or overheating it. They are accordingly particularly dangerous where the component struck is a fuel tank or other fuel-containing component since the result may be ignition of the fuel in the component struck by lightning.

I have heretofore taught that such components can be protected against lightning strike damage by covering the leading portion of the component with a temperature resistant material having good electrical insulating properties and therefore capable of withstanding the highly intense concentrations of electrical energy produced by lightning strikes. Superimposed on the insulating material and extending beyond it to provide a conductive path to a charge dissipating or dispersing area such as the external surfaces of the fuselage, wings, or other aircraft components or combinations of these components is a coating of a highly conductive material such as aluminum. This combination of insulating material and conductive coating provides highly effective protection against lightning strikes since the former protects the component against puncture, heat, and other damage for the brief instant necessary for the concentrated electrical charge to run along the conductive coating to the charge dissipating area of the aircraft.

My copending application No. 652,276 disclosed a system of the type described in the preceding paragraph in which the insulating material is a reinforced plastic and the coating superimposed thereon is aluminum, nickel, or other conductive material. This application suggests that the reinforced plastic be applied by laying it up on the component to be protected, vacuum bagging the component, and heating it to cure the resin followed by spray application of the conductive material.

I have now discovered that a superior bond between the insulating and conductive layers can be obtained by modifying the foregoing technique. This is important since the successful operation of my lightning protection system from a practical point-of-view requires that the insulating layer adhere tightly to the component to be protected and that the conductive layer be bonded tightly to the insulating layer.

The modification I make in my earlier disclosed process to achieve this improved result is to spray a thin coating of the conductive material onto the laid-up reinforced plastic before the resin is cured. Thereafter, the component is bagged and the resin cured followed by spray application of the conductive material until a layer of the desired thickness is produced.

Several approaches to the dissipation of lightning and other static electricity concentrations on aircraft components other than disclosed in my copending applications Nos. 642,492 and 652,276 have heretofore been proposed. One of these, described in U.S. Patent 2,616,638 to George, involves the use of a lead coating capable of acquiring a positive static charge on the leading edges of wings and the like to neutralize negative static charges acquired in flying through snow or ice crystals. This approach would not be satisfactory for the purposes of the present invention since a lead coating does not have the combination of high dielectric strength and high conductivity neecssary to handle the intense concentrations of electrical energy porduced by lightning strikes.

Another approach to the problem of dissipating concentrations of static electricity from aircraft surfaces, discussed in U.S. Patent No. 2,397,118 to Bennett, involves a rubber coating on the components to be protected on which spaced apart bands of conductive material are superimposed. Like that disclosed in the George patent, the Bennett system is intended only to dissipate static charges caused by flying through precipitation. And, like the latter, it would not be capable of handling the intense concentrations of electrical energy produced by lightning strikes since rubber coatings do not have sufficiently high insulating properties to withstand intense electrical concentrations and because the system lacks a continuous path for conducting the charge to the dispersal area.

Moreover, rubber, as used in the Bennett system, would not be capable of withstanding the temperature extremes to which the external surfaces of modern, high speed aircraft are subjected. Therefore, this material would not be at all satisfactory for the purposes of the present invention.

A third approach to the problem of static electricity dissipation in aircraft is described in Reissue Patent No. 25,417 to Amason. The Amason system is limited in use to the protection of components made of an acrylic or similar material having a high dielectric coefficient. Accordingly, it cannot be employed to protect aircraft components having a metal skin. Therefore, the Amason system is not suitable for the purposes of the present invention which is concerned with the protection of aircraft components which are typically fabricated from metallic materials.

From the foregoing it will be apparent that one important and primary object of this invention is the provision of novel, improved methods of and systems for protecting aircraft components susceptible to lightning strikes against damage from such strikes.

A related important and primary object of the invention resides in novel, improved methods of and systems for preventing lightning from igniting fuel in external tanks and other fuel-containing aircraft components struck by lightning.

A third important and primary but more specific object of the invention is the provision of a novel, improved method of manufacturing lightning protection systems consisting of a conductive layer superimposed on a layer of reinforced plastic bonded to the component to be protected which is capable of producing a stronger bond between the two layers of the system than has heretofore been possible.

Related and also important objects of the invention are to provide novel, improved lightning protection systems of the type disclosed in copending application No. 652,-276 and novel, improved methods of manufacturing such systems.

Other important objects, additional advantages, and further novel features of the present invention will become apparent from the appended claims and as the ensuing detailed description and discussion of an exemplary embodiment of the invention proceeds in conjunction with the accompanying drawing.

BRIEF DESCRIPTION OF THE DRAWING

In the drawing:

FIGURE 1 is a pictorial view of an aircraft having components of the type which are adapted to be protected against lightning in accord with the principles of the present invention;

FIGURE 2 is a side view of a wingtip fuel tank incorporated in the aircraft of FIGURE 1 and protected against lightning strikes in accord with the invention; and FIGURE 3 is a section through the fuel tank of FIGURE 2, taken substantially along line 3—3 of the latter figure.

DETAILED DESCRIPTION OF AN EXEMPLARY PREFERRED EMBODIMENT OF THE INVENTION

Referring now to the drawing, FIGURE 1 depicts an aircraft 10 which may be protected against lightning strike damage in accord with the principles of the present invention. Among the components of aircraft 10 most apt to be struck by lightning are wingtip fuel tanks 12 (see also FIGURE 2). Lightning striking wingtip tanks 12 is particularly dangerous since it may damage and ignite the fuel in the tank.

To protect wingtip tanks 12 from lightning strike damage in accord with the principles of the present invention, a thin layer 14 of electrical insulating material (see FIGURE 3) is first applied to the leading portion of each tank to protect it against the heat and physical damage which may be caused by the intense concentrations of electrical energy caused by lightning strikes.

One suitable material for coating 14 is epoxy impregnated fiberglass, which is resistant to high temperatures and has good electrical insulation properties. This is a well-known type of material, which is described in detail in the 1967 edition of the Modern Plastics Encyclopaedia. Other reinforced plastic materials with similar properties can also be used, if desired. A number of these are described in the publication just mentioned.

The insulating material is typically applied in a layer of from approximately 0.030 to about 0.040–0.060 inch thick. The thickness of this layer may, however, be varied as necessary for particular applications of the invention.

Epoxy impregnated fiberglasses of the type preferably employed in the present invention are typically on the order of 0.010 inch thick. Multiple thicknesses are accordingly employed to produce an insulating layer of desired thickness.

The insulating material is applied by laying it up [1] on the component to be protected with each layer after the first being laid up on the preceding layer if multiple layers are employed.[2]

In accord with the present invention a thin coating of pure aluminum (or other conductive material) is applied to the laid-up insulating material, preferably in the form of a spray. This coating is made sufficiently thick to completely cover the insulating material so that the resin in the latter will not bleed through the coating while the resin is being cured. Typically, a thickness of 0.004 inch will be sufficient although it may be desirable to vary this somewhat, depending upon the particular application of the invention.

Following the application of the conductive coating, the component is then bagged in conventional fashion and placed in an oven, typically heated to a temperature on the order of 300–325° F. to cure the resin. At the same time the bag in which the component is sealed is evacuated. This results in the removal of air bubbles from the insulating material and in the creation of a pressure which presses the material tightly against the component to aid in producing a good bond therebetween.

As the curing process proceeds, the resin in the plastic insulating material first flows into contact with the back side of the conductive coating and around the particles of the conductive material. Thereafter, the resin sets up in contact with the coating and around the particles of conductive material, providing a strong mechanical bond between the coating of conductive material and the insulating layer.

For a typical wingtip tank, the insulating layer will extend from the tip of the tank rearwardly for a distance of approximately 36 inches. This distance will of course vary depending up the size, configuration, etc. of the tank or other aircraft component to be protected.

Following the steps described above, additional pure aluminum (or other conductive material) is applied to insulating layer 14 until a layer 16 of conductive material is formed. The complete layer cannot be applied before the resin is cured as might be thought. This because the precuring coating of conductive material must be thin to produce a bond between the conducting and insulating layers. This layer will typically be about 0.020–0.50 inch thick, but may vary beyond these limits for particular applications of the invention.

Because of the novel manner in which the conductive material is applied, there will be a strong bond between the insulating and conducting layers 14 and 16 thus formed. This is highly desirable since, as discussed above, the integrity of this bond is essential to the successful practical operation of the type of lightning protection system disclosed herein.

As shown in FIGURE 3, conductive layer or coating 16 is extended beyond insulating material 14 and bonded to the skin 18 of wingtip tank 12. This provides a conductive path along which the electrical charge produced by lightning striking wingtip tank 12 may run off into a dispersal or charge dissipating area. In the illustrated embodiment of the present invention, the charge dissipating area may include the external surfaces of wingtip tanks 12 and, in addition, the external surfaces of wings 20, fuselage 22, and the members of tail assembly 24 of aircraft 10, making rapid dissipation of the charge possible.

The rapid dissipation of electrical charges along conductive coating 16 together with the resistance to heat and other physical damage from such charges provided by insulating material 14 combine to prevent even highly intense electrical charges from damaging the protected

---

[1] The term "laying up" as applied to reinforced plastics in general and to the present invention in particular refers to the cutting of the material and the placing of it on the component in the position in which it is to be bonded.

[2] It is not essential that the resin and reinforcing material be applied simultaneously. These components of the insulating layer can be applied separately by any of several well-known techniques, if preferred.

component or components. Accordingly, this combination of insulating material and conductive coating provides highly effective protection against lightning strikes.

Outer conductive coating 16 is preferably applied by the flame spray technique to aid in producing a strong mechanical bond between the insulating material and the conductive coating, to obtain a homogeneous layer of the coating material on the component to be protected, and to provide accurate control of the thickness of material applied.

In the flame spray process, the coating material is applied by reducing it to molten particles and projecting the particles at high velocity against the surface to be coated, the particles solidifying and adhering to the surface as they strike it. The flame spray technique is described in detail in various publications available from the Norton Company and from the assignee of the present invention. For this reason and because the details of this process are not part of the present invention, it is not considered necessary to describe it in more detail herein.

After it is applied, the conductive coating may, if preferred, be sanded, ground, polished, or otherwise treated to produce a finish with the desired degree of smoothness.

In the case of supersonic aircraft, external surfaces of the aircraft may reach temperatures approaching the melting point of pure aluminum. Accordingly, in applications of the present invention to supersonic aircraft, a conductive material with a higher melting point, such as a nickel-chrome or other alloy, is employed rather than aluminum in outer coating 16.

Components of aircraft 10 in addition to wingtip tanks 12 are susceptible to lightning strikes. These include fuselage 22, wings 20, and the members of tail assembly 24. The foregoing components can be protected against lightning strike damage in the same manner as wingtip tanks 12.

It will also be apparent from the foregoing that the principles of the present invention can equally well be applied to other externally carried fuel tanks such as pylon and belly tanks and to aeronautical vehicles other than airplanes. Accordingly, to the extent that such other applications of the present invention not described in detail herein are not excluded from the appended claims, they are fully intended to be covered therein.

The invention may be embodied in other specific forms without departing from the spirit or essential characteristics thereof. The present embodiment is therefore to be considered in all respects as illustrative and not restrictive, and all changes which come within the meaning and range of equivalency of the claims are therefore intended to be embraced therein.

What is claimed and desired to be secured by Letters Patent is:

1. The method of protecting aircraft components against damage from lightning strikes and the like, comprising the steps of sequentially applying to the leading portion of the component to be protected a layer of a temperature resistant, reinforced plastic, electrical insulating material, covering completely the material thus applied with a superimposed coating of electrically conductive material, and curing the insulating material to bond it to the coating material and to the component to be protected, said coating of electrically conductive material being extended beyond said layer of electrical insulating material and bonded to the component to be protected so that said coating will conduct electricity from the leading portion of the component to effect a dispersal thereof.

2. The method of claim 1, wherein the superimposed coating is applied by spraying the electrically conductive material onto the component to be protected in molten form.

3. The method of claim 1, wherein the electrically conductive material is aluminum.

4. The method of protecting aircraft components against damage from lightning strikes and the like, comprising the steps of sequentially applying to the leading portion of each component to be protected a layer of a temperature resistant, reinforced plastic, electrical insulating material, covering completely the material thus applied with a thin coating of electrically conductive material, curing the electrical insulating material to bond it to said electrically conductive material and to the component to be protected, and thereafter applying additional conductive material to the leading portion of the component to be protected to increase the thickness of the conductive coating superimposed thereon, said electrically conductive material being extended beyond said layer of electrical insulating material and bonded to the component to be protected so that said coating of electrically conductive material will conduct electricity from the leading portion of the component to effect a dispersal thereof.

5. The method of claim 4, wherein the conductive material applied prior to the curing of the reinforced plastic insulating material is applied to a thickness on the order of 0.004 inch.

6. The combination of a aeronautical vehicle having a component which has a relatively sharp leading edge and is therefore susceptible to being struck by lightning and means for preventing lightning striking said component from damaging said component, said last-named means comprising a layer of temperature resistant, electrical insulating, reinforced plastic material having a high degree of physical integrity covering at least the leading portion of the component to prevent lightning striking said component from penetrating through or heat damaging the component; a grounded, electrically conductive coating superimposed on said insulating layer for conducting electricity from the area of the component covered by the insulating material to the ground to effect a dispersal thereof, said coating of electrically conductive material being continuous and completely covering the insulating layer and, further, being extended beyond said insulating layer and being bonded to the component for conducting electricity from the leading portion of the component to effect a dispersal thereof, and means comprised of electrically conductive material of the type in said superimposed coating bonding said coating to said insulating layer.

7. The combination of claim 6, wherein the conductive material superimposed on the electrical insulating material is aluminum.

References Cited

UNITED STATES PATENTS

| | | | |
|---|---|---|---|
| 1,419,261 | 1/1922 | Howard | 244—1 |
| 2,081,517 | 5/1937 | Van Hoffen | 117—217 |
| 3,372,054 | 3/1968 | Wishnie et al. | 117—105.2 |
| Re. 25,417 | 7/1963 | Amason | 244—1 |

OTHER REFERENCES

The Metco Flame Spraying Processes; Metallizing Engineering Co., Inc.; Westbury, N.Y.; 1960; Bulletin 136B.

Powders for Flame Spraying; Metallizing Engineering Co., Inc.; Westbury, N.Y.; 1963; Bulletin 10F 1/M 8-63.

MILTON BUCHLER, Primary Examiner

J. L. FORMAN, Assistant Examiner

U.S. Cl. X.R.

317—2